United States Patent
Skog et al.

(10) Patent No.: US 7,944,880 B2
(45) Date of Patent: May 17, 2011

(54) METHOD AND ARRANGEMENT FOR ESTABLISHING A COMMUNICATION SESSION FOR MULTIMEDIA

(75) Inventors: Robert Skog, Hässelby (SE); Martin Körling, Sollentuna (SE); Steinar Dahlin, Järfälla (SE); Clary Hallberg Dahlin, legal representative, Järfälla (SE); Per Synnergren, Luleå (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 378 days.

(21) Appl. No.: 12/097,187

(22) PCT Filed: Dec. 12, 2005

(86) PCT No.: PCT/SE2005/001893
§ 371 (c)(1),
(2), (4) Date: Aug. 6, 2008

(87) PCT Pub. No.: WO2007/069941
PCT Pub. Date: Jun. 21, 2007

(65) Prior Publication Data
US 2010/0220604 A1  Sep. 2, 2010

(51) Int. Cl.
*H04W 4/00* (2009.01)
(52) U.S. Cl. .................. 370/329; 370/437
(58) Field of Classification Search .......... None
See application file for complete search history.

(56) References Cited

U.S. PATENT DOCUMENTS

| | | | |
|---|---|---|---|
| 6,374,112 | B1 | 4/2002 | Widegren et al. |
| 6,683,853 | B1 | 1/2004 | Kannas et al. |
| 6,944,473 | B2 * | 9/2005 | Irwin et al. ............... 455/550.1 |
| 7,437,153 | B2 * | 10/2008 | Roberts et al. ............. 455/423 |
| 7,693,102 | B2 * | 4/2010 | Hayashi ..................... 370/329 |
| 7,724,700 | B1 * | 5/2010 | Grayson et al. ............ 370/328 |
| 7,756,119 | B2 * | 7/2010 | Pasanen et al. ............ 370/352 |
| 2001/0018342 | A1 * | 8/2001 | Vialen et al. ............... 455/423 |
| 2001/0055971 | A1 * | 12/2001 | Irwin et al. ................ 455/450 |
| 2004/0043771 | A1 * | 3/2004 | Shin ........................... 455/453 |
| 2004/0085949 | A1 * | 5/2004 | Partanen et al. ........... 370/352 |
| 2005/0041617 | A1 | 2/2005 | Huotari et al. |
| 2007/0064710 | A1 * | 3/2007 | Holmstrom et al. ...... 370/395.2 |
| 2010/0017521 | A1 * | 1/2010 | Ying et al. .................. 709/227 |

FOREIGN PATENT DOCUMENTS

| | | |
|---|---|---|
| FR | 2852178 A | 9/2004 |
| GB | 2386282 A | 9/2003 |
| JP | H09-116551 A | 5/1997 |

* cited by examiner

*Primary Examiner* — Donald L Mills

(57) ABSTRACT

A method and arrangement for establishing a packet-switched multimedia session for a mobile terminal connected to a mobile access network. A first Radio Access Bearer RAB is obtained, and the multimedia session is started by communicating media over the first RAB. Simultaneously with the media communication, a quality of communicated media is monitored and evaluated. If the monitored quality is deemed unacceptable, a media-adapted second RAB is obtained, and the session is continued over the second RAB. Thereby, it is not necessary to delay the communication of media by waiting for the second RAB to be obtained.

39 Claims, 4 Drawing Sheets

METHOD AND ARRANGEMENT FOR ESTABLISHING A COMMUNICATION SESSION FOR MULTIMEDIA

TECHNICAL FIELD

The present invention relates generally to a method and arrangement for establishing a communication session for multimedia involving a mobile terminal. In particular, the invention may reduce the delay before the mobile terminal can start communicate media.

BACKGROUND

With the emergence of 3G mobile telephony, new packet-based communication technologies have been developed to support multimedia communication. For example, GPRS (General Packet Radio Service) and WCDMA (Wideband Code Division Multiple Access) technologies support wireless multimedia telephony services involving packet-switched communication of data representing images, text, documents, animations, audio files, video files, etc., in addition to traditional circuit-switched voice calls.

Multimedia services typically entail transmission of encoded data representing text, documents, images, audio files and video files in different formats and combinations. The term "multimedia" will be used in this description as generally referring to any choice of media communicated by using the packet based IP (Internet Protocol) transport technology.

A network architecture called "IP Multimedia Subsystem" (IMS) has been developed by the 3$^{rd}$ Generation Partnership Project (3GPP) as an open standard for handling multimedia services and sessions in the packet domain. IMS is a platform for enabling services based on IP transport, more or less independent of the access technology used, and is neither restricted to any specific services. Thus, IMS networks are used for controlling multimedia sessions by acting as a "control plane" for the sessions, whereas the actual transfer of payload data is typically routed over access networks and any intermediate transport networks, although nodes in the IMS network may also be used.

FIG. 1 is a simplified schematic illustration of a basic network structure for providing multimedia services by means of an IMS service network. A first mobile terminal A is connected to a first radio access network 100 and communicates with a second mobile terminal B connected to a second radio access network 102, in a communication session S involving one or more multimedia services. There may also be an intermediate backbone network, not shown, as well linking the access networks 100 and 102.

An IMS network 104 is connected to the first radio access network 100 and handles the session with respect to terminal A. In this figure, a corresponding IMS network 106 handles the session on behalf of terminal B, and the two IMS networks 104 and 106 may be controlled by different operators. Alternatively, terminals A and B may of course be connected to the same access network and/or may belong to the same IMS network. Terminal A may also communicate with a fixed terminal or computer or server instead, e.g. for downloading some media over the Internet, as long as the other party is capable of SIP communication. Moreover, if a terminal is roaming in a visited access network, multimedia services are handled by the terminal's "home" IMS network.

The session S shown in FIG. 1 is managed by specific nodes in each IMS network, here generally referred to as "session managing nodes" 108. These nodes typically include S-CSCF (Serving Call Session Control Function), I-CSCF (Interrogating Call Session Control Function) and P-CSCF (Proxy Call Session Control Function). Each IMS network 104,106 also includes one or more application servers 110 for enabling various multimedia services. Further, a main database element HSS (Home Subscriber Server) 112 stores subscriber and authentication data as well as service information, among other things. IMS network 106 is basically similar to network 104. The various specific functions of the shown network elements 108-112 are generally known in the art, but are not necessary to describe here further to understand the context of the present invention. Of course, the IMS networks 104,106 contain numerous other nodes and functions not shown here for the sake of simplicity.

A specification for handling sessions in IMS networks has been defined called "SIP" (Session Initiation Protocol, according to the standard IETF RFC 3261). SIP is an application-layer control protocol for signalling, to create and generally handle sessions over a packet-switched logic. The SIP standard is thus used by IMS systems and SIP-enabled terminals to establish and control IP multimedia communications. SIP itself does not provide multimedia services, but rather makes available a set of primitives that other protocols or applications can use to actually implement such services. For example, a message called "INVITE" is defined in SIP to initiate multimedia sessions. The SIP INVITE message includes, among other things, information on what application server to invoke during session set-up, a nickname and SIP URI (Universal Resource Identifier) of the calling party, the SIP URI of the called party, and other communication parameters needed for the forthcoming session.

SIP uses an additional protocol called Session Description Protocol, SDP, for describing the media content to be transferred in multimedia sessions. An SDP message can be embedded as a self-contained body within SIP messages. SDP messages can be used by terminals to exchange information regarding their specific capabilities and preferences, in order to negotiate and agree on which session parameters, codecs in particular, to use during a forthcoming multimedia session, as is well-known in the art.

Many mobile applications require a certain Quality of Service QoS in order to provide a satisfying result to end-users. For UMTS networks, four main QoS traffic classes have been defined: "conversational class", "streaming class", "interactive class" and "background class", in order to classify different needs regarding bitrates and delays. These classes are primarily distinguished by their requirements regarding transfer delays, such that applications of the conversational class tolerate only small delays, sometimes also referred to as "real-time", whereas the background class is applied to the least delay-sensitive applications, sometimes also referred to as "best effort".

The selection of a UMTS QoS traffic class for an application is used for assigning a suitable Radio Access Bearer RAB in the access network, including a radio channel, in order to optimise the scarce radio recourses in the access network whilst maintaining acceptable quality for the end-user.

Mobile terminals capable of multimedia are typically configured to identify for each inherent application, a UMTS QoS traffic class, as schematically illustrated in FIG. 2. Thus, a mobile terminal may hold a number of applications 200, denoted as A1, A2, A3, A4, A5 .... A mapping function 202 in the terminal translates each application to a certain UMTS QoS traffic class 204, of which only two are shown here. In this case, applications A1, A2 and A4 are mapped to the same UMTS QoS traffic class 2, since they have similar requirements regarding bitrate and delay, whereas applications A3 and A5 are mapped to UMTS QoS traffic class 1. In this way, several applications with similar characteristics may be mapped onto the same RAB, fulfilling their requirements.

However, before a mobile terminal can exchange any SIP messages with the IMS network, a "PDP context" must be established for the terminal. Basically, a PDP context can be activated once the terminal has been powered on. Activating a PDP context for a mobile terminal includes allocating an IP address to the terminal, to be able to communicate data packets with the terminal. A PDP context also means that an RAB is allocated in the access network for IP communication. Thus, SIP messages can only be sent over a PDP context.

FIG. 3 illustrates the gradual activation of a mobile terminal A about to communicate multimedia with another party, involving basically five stages 3:1-3:5 as illustrated, each comprising various messages back and forth. These messages are well-known in the art and will not be described in any detail. Terminal A is located under radio coverage of a mobile access network 300, which is divided into a radio network part 300a and a core network part 300b including the nodes SGSN (Serving GPRS Switching Node), HLR (Home Location Register) and GGSN (Gateway GPRS Switching Node), among other things. The other party may be another mobile terminal B connected to a mobile access network 302, or a fixed telephone or computer, or a server connected to the Internet 304.

In a first stage 3:1, when terminal A is powered on, it is registered as a connected "Mobile Station MS" with the access network 300, for circuit-switched communication. SGSN and HLR in core network 300b are involved in this initial stage of establishing a radio connection for attaching the terminal.

Next, a first PDP context, referred to as "primary", is activated in a stage 3:2, to obtain an IP connection. Activating the primary PDP context includes obtaining a RAB for packet-switched SIP signalling messages over IP. The PDP context is created by GGSN in network 300b. This RAB is typically based on so-called "best effort" communication with no particular requirements regarding bitrate and delay, since it is only intended to occasionally carry relatively short SIP messages. Furthermore, the RAB characteristics of a primary PDP context may fluctuate depending on variations in available capacity and bandwidth in the access network. "Best effort" means basically that any available radio resources and bandwidth not needed for other connections with higher priority, can be used. Thus, the primary PDP context is adapted for signalling messages.

In a third stage 3:3, terminal A registers with the IMS network 306, as basically handled by an S-CSCF node and HSS therein, as illustrated. The IMS registration involves a certain amount of SIP-based signalling over the primary PDP context.

Next, a multimedia session is to be established with another party in a following stage 3:4. In this stage, the above-mentioned protocol SDP is used within the SIP messages, such as INVITE, to communicate session-specific parameters including codecs. The following UMTS parameters may be derived from the SDP message: Traffic class, Maximum bitrate (uplink/downlink), Guaranteed bitrate (uplink/downlink), Transfer delay (uplink/downlink), Delivery order, Maximum SDU (Service Data Unit) size and a Source Statistic Descriptor.

In a next stage 3:5, a secondary PDP context is activated for terminal A, and should be adapted for the media type(s) involved in the forthcoming session. The secondary PDP context is handled by GGSN in the same manner as for the primary PDP context in stage 3:2. Thus, the secondary PDP context should be defined so as to fulfil the requirements of the session with respect to the SDP information as well as other factors, in order to obtain a proper RAB for media to be communicated. The new RAB is thus more stable and reliable as compared to the first one associated with the primary PDP context.

Activating the secondary PDP context according to stage 3:5 is a somewhat time-consuming process. It should be noted that, if the other party is an IMS enabled mobile terminal B, a corresponding process takes place on the other side for that terminal as well. When the secondary PDP context has finally been activated, the session can start as illustrated in a stage 3:6, using the allocated new RAB.

The communication of media is thus delayed by waiting for the secondary PDP context to be activated and a corresponding RAB to be allocated, according to conventional set-up procedures for multimedia sessions. In the field of mobile communication, it is generally desirable to minimise such delays in order to make multimedia services more attractive to mobile end-users. It is also desirable to reduce the complexity and general amount of signalling in the session set-up procedure. In mobile networks, it is further generally desirable to avoid excessive occupation of bandwidth in the air interface due to scarce radio resources.

SUMMARY

It is an object of the present invention to address at least some of the problems outlined above. More specifically, it is an object of the present invention to make it possible to reduce delays and bandwidth occupation when mobile terminals communicate media.

These objects and others can be obtained by providing a method and a mobile terminal according to the independent claims attached below.

In the inventive method of establishing a packet-switched multimedia session for a mobile terminal connected to a mobile access network for the communication of media, a first Radio Access Bearer RAB is obtained, and the multimedia session is started by communicating the media over the first RAB. A quality of communicated media is monitored and evaluated simultaneously with the media communication over the first RAB. If the monitored quality is deemed unacceptable, a media-adapted second RAB is obtained based on quality requirements of the ongoing media communication, and the session continues over the second RAB.

The first RAB may be obtained by activating a primary PDP context adapted for signalling messages or by activating a pre-established secondary PDP context adapted for media communication. The first RAB may further be a default RAB. Alternatively, the first RAB may be adapted for said communicated media, initially. The session may be completed over the first RAB, if the monitored quality remains acceptable throughout the session.

The media-adapted second RAB may be obtained by activating a secondary PDP context adapted for said communicated media, or by modifying the first RAB and pre-established secondary PDP context to be adapted for said communicated media. The communication of media is then switched from the first RAB to the media-adapted second RAB, once the secondary PDP context has been activated or the pre-established secondary PDP context has been modified.

The media-adapted second RAB may be obtained when at least one media stream has been added or changed during the ongoing media communication.

The quality may be monitored according to a predetermined monitoring algorithm. The quality of a received media stream can be monitored by measuring any of the following parameters: a packet buffer size in the terminal, a transfer bitrate, a bit error rate, a retransmission rate, and detected disturbances in the play-out or presentation of media to an end-user, as input to said monitoring algorithm. The monitoring algorithm may be configured such that the monitored quality is deemed acceptable as long as the measured buffer size stays above a predetermined level, and/or if the measured bitrate of the media stream stays above a predetermined level, and/or if the measured bit error rate and/or retransmission rate does not exceed a predetermined level. The monitoring algorithm may further be configured such that the monitored quality is deemed unacceptable whenever one or more of the measured parameters stays above or does not exceed, respectively, said level(s) for a preset duration or repeatedly.

If SIP is used for signalling, the monitoring algorithm may be based on requirements derived from information in an SDP message given in an INVITE message, and/or a response thereto.

The quality of communicated media may be monitored and evaluated by the mobile terminal. Alternatively or additionally, the quality may further be monitored and evaluated by a quality monitor in the mobile access network or in a multimedia service network currently controlling the session. Obtaining a media-adapted second RAB may be initiated by sending a PDP context triggering message to the mobile terminal or to a GGSN node in the mobile access network.

The present invention further provides an arrangement for establishing a packet-switched multimedia session for a mobile terminal connected to a mobile access network for the communication of media. The inventive arrangement comprises means for obtaining a first Radio Access Bearer RAB, means for starting the multimedia session by communicating said media over the first RAB, means for monitoring and evaluating a quality of communicated media simultaneously with the media communication over the first RAB, and means for obtaining a media-adapted second RAE based on quality requirements of the ongoing media communication, if the monitored quality is deemed unacceptable. Thereby, the session can continue over said second RAB.

The means for obtaining a first RAB may be configured to obtain the first RAB by activating a primary PDP context adapted for signalling messages, or by activating a pre-established secondary PDP context adapted for media communication. The first RAB may further be a default RAB. Alternatively, the first RAB may be initially adapted for said communicated media.

The inventive arrangement may further comprise means for completing the session over the first RAB, if the monitored quality remains acceptable throughout the session. Otherwise, the means for obtaining a media-adapted second RAB may be configured to obtain the second RAB by activating a secondary PDP context adapted for said communicated media. The means for obtaining a media-adapted second RAB may further be configured to obtain the second RAB by modifying said first RAB and pre-established secondary PDP context to be adapted for said communicated media.

The inventive arrangement may further comprise means for switching the communicated media from the first RAB to the second RAB, once the secondary PDP context has been activated or the pre-established secondary PDP context has been modified. The means for obtaining a media-adapted second RAB may further be configured to obtain a media-adapted second RAB when at least one media stream has been added or changed during the ongoing media communication.

The monitoring and evaluating means may be configured to monitor the quality according to a predetermined monitoring algorithm. The monitoring and evaluating means may further be configured to obtain measurements of any of the following parameters: a packet buffer size in the terminal, a transfer bitrate, a bit error rate, a retransmission rate, and detected disturbances in the play-out or presentation of media to an end-user, and to provide said measurements to the processor as input to said monitoring algorithm to indicate the quality of a received media stream.

The monitoring algorithm may be configured such that the quality is deemed acceptable as long as the measured buffer size stays above a predetermined level, and/or if the measured bitrate of the media stream stays above a predetermined level, and/or if the measured bit error rate and/or retransmission rate does not exceed a predetermined level. The monitoring algorithm may further be configured such that the monitored quality is deemed unacceptable whenever one or more of the measured parameters stays above or does not exceed, respectively, said level(s) for a preset duration or repeatedly.

If SIP is used for signalling, the monitoring algorithm may be based on requirements derived from information in an SDP message given in an INVITE message, and/or a response thereto.

The monitoring and evaluating means is implemented in the mobile terminal, or as a quality monitor in the mobile access network or in a multimedia service network currently controlling the session. The means for obtaining a media-adapted second RAB may be configured to send a PDP context triggering message to the mobile terminal or to a GGSN node in the mobile access network.

The present invention further provides an arrangement in a mobile terminal, when connected to a mobile access network, for establishing a packet-switched multimedia session for the communication of media. The inventive mobile terminal arrangement comprises a communication unit configured to obtain a first Radio Access Bearer RAB, and to start the multimedia session by communicating media over the first RAB, and a processor configured to monitor and evaluate a quality of communicated media simultaneously with the media communication over the first RAB, and to trigger the communication unit to obtain a media-adapted second RAB based on quality requirements of the ongoing media communication, if the monitored quality is deemed unacceptable. Thereby, the session can continue over said second RAB.

The mobile terminal arrangement may further comprise a measuring unit configured to provide measurements to the processor from at least one of: a data buffer, a decoder and a media play-out unit.

The present invention further provides a quality monitor for monitoring and evaluating a quality of communicated media. The inventive quality monitor comprises a measurement receiver for receiving quality measurements regarding an ongoing multimedia session for a mobile terminal using a first RAB, a processor for evaluating the quality measurements and for determining whether a media-adapted second RAB is needed to fulfil quality requirements of the ongoing multimedia session. The quality monitor also comprises and a PDP context triggering unit configured to send a message to the mobile terminal or to a GGSN node in the access network, if said quality is deemed unacceptable, said message triggering a media-adapted second RAB based on quality requirements of the ongoing media communication. Thereby, the session can continue over said second RAB.

The inventive quality monitor may be configured to be implemented in a mobile access network to which the mobile terminal is currently connected, or in a multimedia service network currently controlling the session. The quality monitor may further be configured to receive quality measurements from at least one of: a mobile access network to which the mobile terminal is currently connected, a multimedia service network currently controlling the session, and the mobile terminal.

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 1:
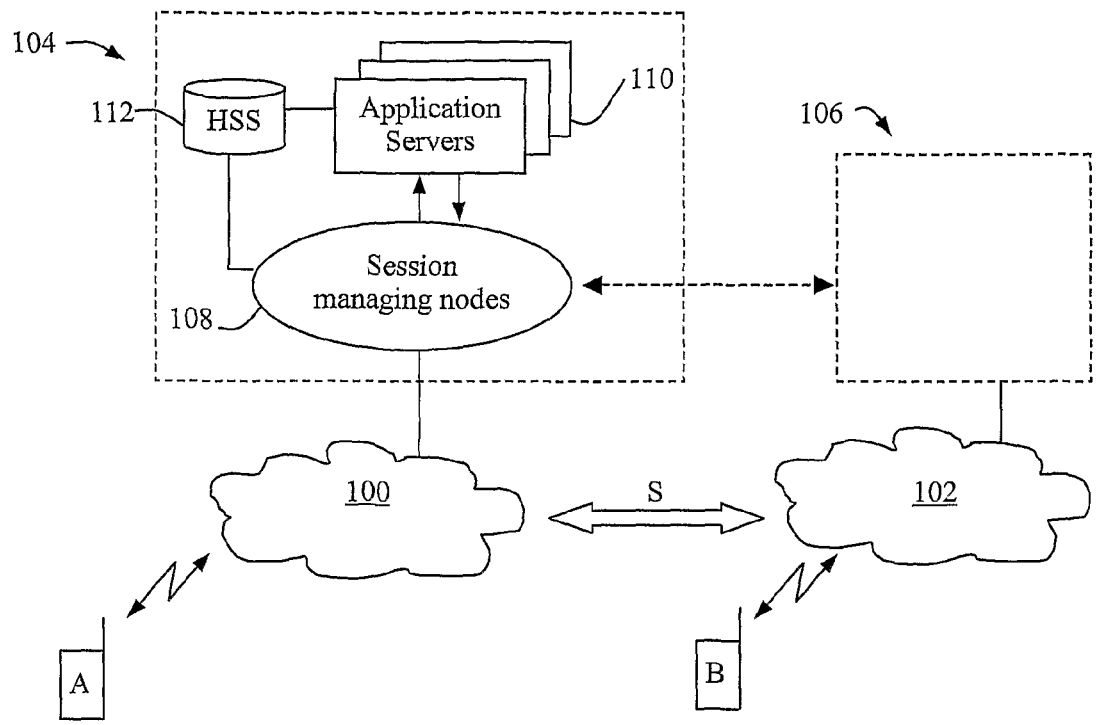
FIG. 1 is a schematic view of a conventional network structure for communicating multimedia between two mobile terminals.
Figure 2:
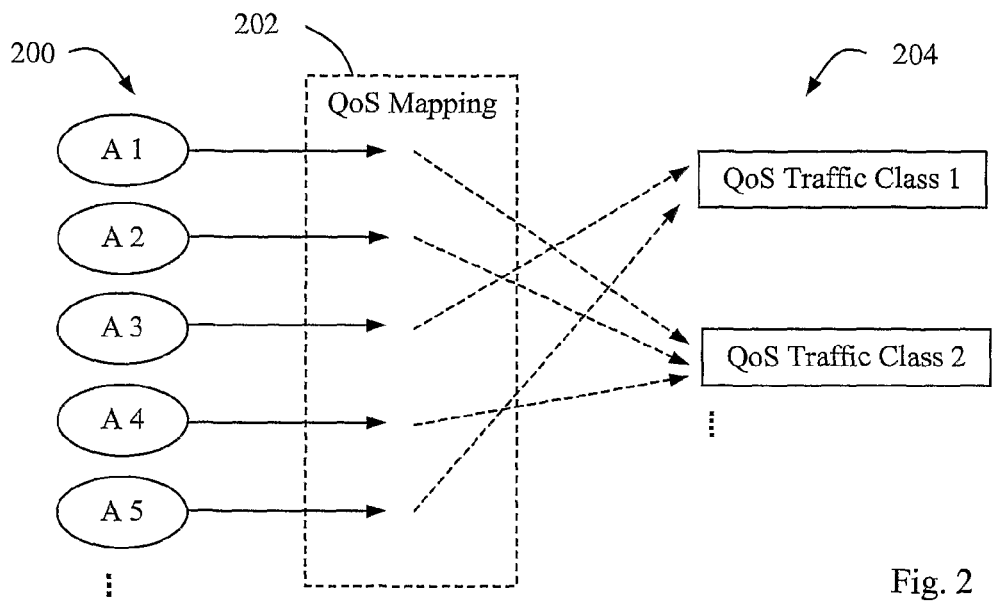
FIG. 2 is a schematic diagram illustrating the mapping of applications onto UMTS QoS traffic classes in a mobile terminal.

Briefly described, the present invention is directed to starting media communication over a first RAB, and if the quality of communicated media becomes unacceptable, a second RAB is obtained based on quality requirements of the ongoing media communication. In other words, the second RAB is selected to fulfil those quality requirements when not being fulfilled by means of the first RAB, and the session is then continued on the second RAB.

For example, if the first RAE is obtained by activating a primary PDP context adapted for signalling messages, it is not necessary to wait until a secondary PDP context has been activated before communicating the media, at least initially, and delays can thus be reduced. It is also possible to communicate media over a "pre-established" secondary PDP context using a default RAB that has not been specifically adapted to the communicated media, which will be described in more detail later below.

As described above, the concept of a primary PDP context was originally intended to be used for signalling messages only, e.g. according to SIP, the RAB of a primary PDP context naturally being a default RAB. As a result, the RAB characteristics of a primary PDP context are typically not stable and can vary over time, being based on best effort. Nevertheless, it may well be the case in some situations that the obtained first RAB, e.g. for the primary PDP context, is quite good with respect to QoS, e.g. when located in a cell currently having much free radio resources. Therefore, communication of media over a primary PDP context may be successful, even if no secondary PDP context according to requirements of the application and media used, has been activated as yet.

A so-called pre-established secondary PDP context is generally intended to be used for media and can be activated basically at the same time as the primary PDP context. However, being a pre-established PDP context, its RAB characteristics are determined before the mobile terminal has any knowledge of the QoS needs for the forthcoming media stream, hence using a default RAB. Therefore, the default RAB of a pre-established PDP context may or may not fulfil the QoS requirements for the media. Thus, the pre-established secondary PDP context can also be considered as "best-effort" type, and its characteristics are typically not stable and may vary over time. Nevertheless, it may well be the case in some situations that the obtained first RAB for the pre-established secondary PDP context is well-suited for the media transfer. Therefore, communication of media over a pre-established secondary PDP context may be successful as well, at least for a period of time.

In another case, media may be communicated after establishing a "regular" secondary PDP context, as described in the background section above, using a first RAB that has been properly obtained based on quality requirements of the media communication. Still, the quality of communicated media may become unacceptable after a while, e.g. if further media is added to the session, or if the radio conditions should deteriorate. By monitoring and evaluating the quality, a second RAB can then be obtained that fulfils those quality requirements, as soon as the first RAB fails to do so.

In order to maintain a proper QoS during a session, even if a fluctuating first RAB should deteriorate or further media is added, the actual QoS is thus monitored and evaluated in the background as media is communicated over the first RAB. The QoS can be monitored by the mobile terminal or by a network node, as will be illustrated below. If monitored by the mobile terminal, and if the QoS should fall below a predetermined acceptance level, i.e. become unacceptable to an end-user, the mobile terminal may either:

- issue a request for a secondary PDP context towards the access network, in order to obtain a new RAB that fulfils the QoS requirements of the application used, or
- issue a request for a modification of a pre-established secondary PDP context towards the access network, in order to obtain, e.g., a guaranteed higher bit-rate or decreased transfer delays.

In the case when a new RAB has been obtained, one or more media flows are moved from the previous RAB to the new RAB, for continued communication. Below, three practical examples are given.

EXAMPLE 1

In the case of a plain voice service, the voice media stream may be moved from a primary PDP context using a first RAB, to a secondary PDP context using a second RAB.

EXAMPLE 2

In the case of a voice and video service, both the video stream and the voice stream may be moved to the newly-established PDP context using a second RAB.

EXAMPLE 3

In the case of a voice service already running over a pre-established secondary PDP context using a first RAB, in which a video stream is introduced at some point, a new secondary PDP context, in effect being a third PDP context, may be established using a second RAB. The video stream may be moved to the new (second) RAB of the secondary PDP context, while the voice stream is still communicated on the previous (first) RAB.

It should be noted that the end-user may perceive the switch of PDP context and RAB as a temporary pause in the play-out of received media or a conversation, depending on whether a buffer in the terminal is empty on received data packets or not.

In the case when a pre-established secondary PDP context has been modified, the second RAB in this context is a modified first RAB for continued communication. For example, a media stream may have started on a pre-established secondary PDP context using a first RAB. If then the monitored QoS falls below a predetermined acceptance level, the second RAB may be obtained by modifying the PDP context and the first RAB with respect to the QoS required for the media stream.

On the other hand, if the monitored QoS stays above the acceptance level throughout the session using a first RAB, it may not become necessary at all to request for a secondary PDP context, or to modify a pre-established secondary PDP context, and switch to a second RAB. The first RAB may thus be used throughout the session, when fulfilling the QoS requirements. In that case, much signalling has been avoided for the session as compared to the conventional procedure, thereby saving both time and bandwidth. Moreover, the initially obtained first RAB may not demand as much radio resources as a second RAB would do. When the first RAB is obtained for a primary PDP context, the communication of media can start over the primary PDP context, i.e. earlier in the process as compared to the conventional technique described in the background section. If a secondary PDP context becomes necessary at some point during the session, the only nuisance might be a perceived disturbance, if any, of media play-out or in a conversation at the receiving party.

Figure 3:
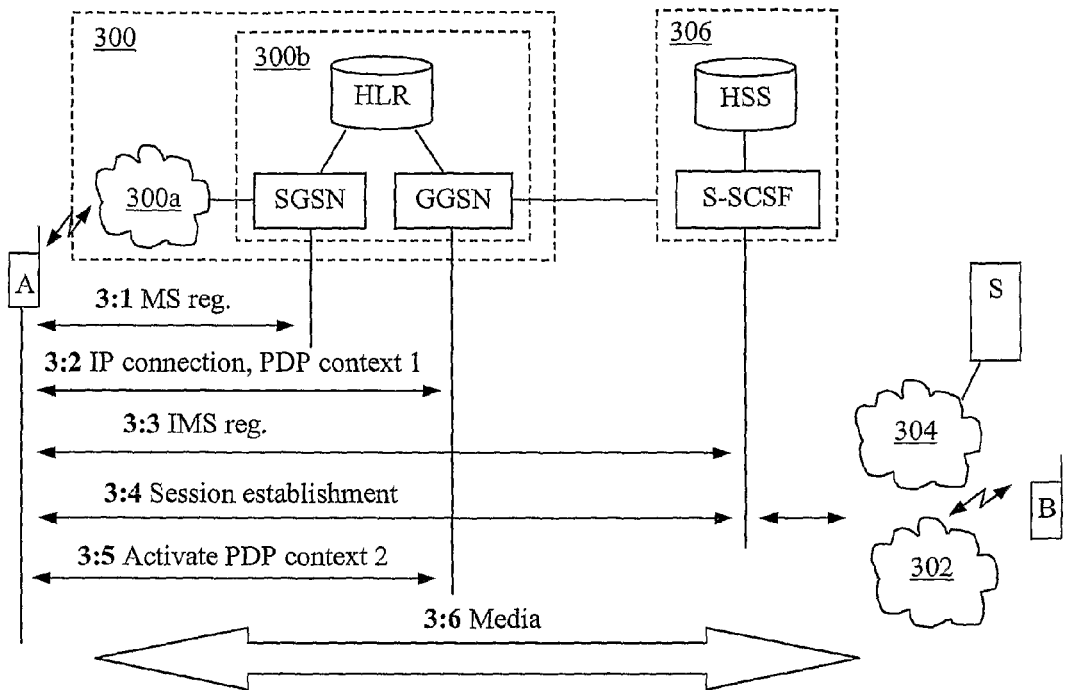
FIG. 3 is a signalling diagram illustrating different stages in the process of establishing multimedia communication, according to the prior art.
Figure 4:
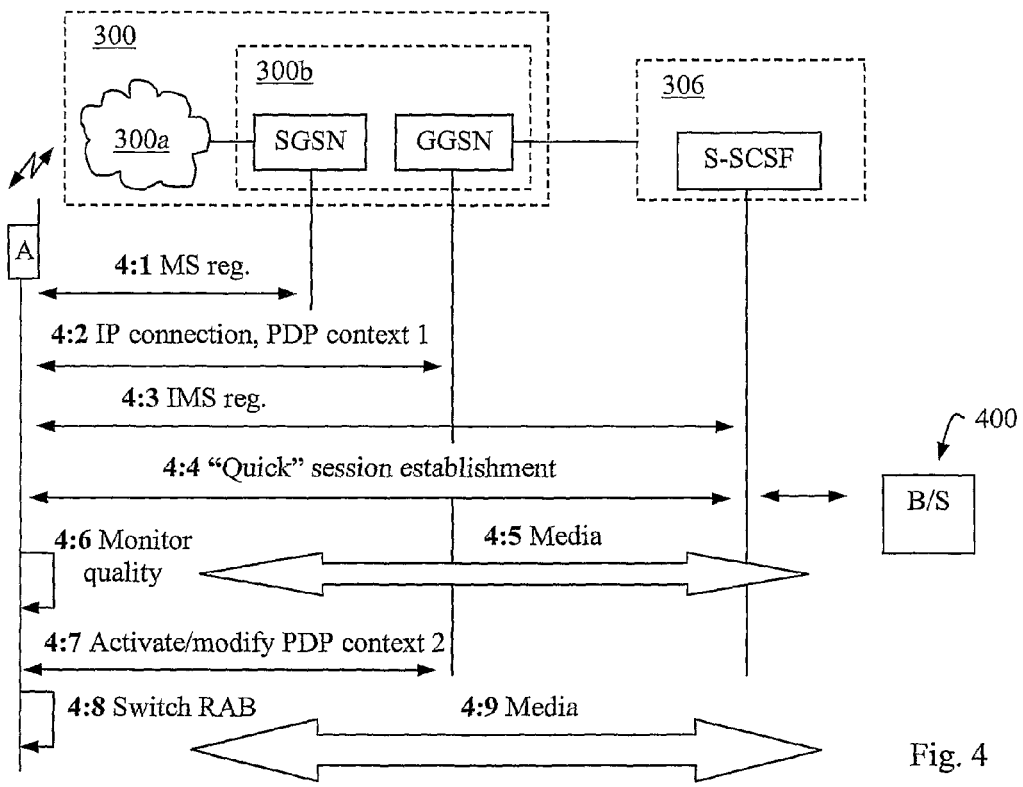
FIG. 4 is a signalling diagram illustrating different stages in the process of establishing multimedia communication for a mobile terminal, in accordance with one embodiment.

FIG. 4 is a signalling diagram illustrating different stages in the process of initiating and controlling multimedia communication, according to one embodiment. In this case, the quality of communicated media is monitored and evaluated in a mobile terminal A. The scenario is similar to the one shown in FIG. 3, and the same numerals are used for corresponding elements involved in the session set-up process. It should be noted that the opposite party 400 is generally represented by a block "B/S", indicating that it may be a mobile or fixed terminal B, a computer or a server S.

The first three stages of registering the terminal A as a mobile station, stage 4:1, activating a primary PDP context, stage 4:2, and registering terminal A in the IMS network, stage 4:3, are basically the same as stages 3:1, 3:2 and 3:3 in FIG. 3, which will therefore not be described again here. However, stage 4:2 may further include activation of a pre-established secondary PDP context, as mentioned above.

Next, a multimedia session is to be established with opposite party 400, either by terminal A calling or contacting party 400, or vice versa. However, a "quick" session establishment stage 4:4 may now be introduced, replacing the previous conventional session establishment stage 3:4 and omitting the stage 3:5 of selection and activation of a media-adapted secondary PDP context at this point. This may reduce the delay or waiting time considerably before media transmission can begin, in some cases approximately 1-2 seconds, by omitting all messages back and forth needed for activation of the media-adapted secondary PDP context. Hence the epithet "quick". However, the present invention does not exclude establishment of a "regular" secondary PDP context after stage 4:4, that is based on quality requirements of the media communication.

In the session establishment stage 4:4, the two parties A and B/S may negotiate and agree on session-specific parameters to be used in the forthcoming session, including codecs, by exchanging suitable SIP messages, typically an INVITE message and a response message thereto. Moreover, information from an SDP message given in the INVITE message, and/or a response thereto, is also saved for later use, see below.

After establishing the session with the opposite party 400, the communication of media is started over the primary (or secondary) PDP context using a first RAB, as indicated in a next stage 4:5, assuming that the first RAB may be capable of conveying the media, at least initially, even though it may, e.g., only have been adapted for signalling messages. Alternatively, the media communication may be started over a pre-established or regular secondary PDP-context at this point, as described above. The RAB of a pre-established or regular secondary PDP context will also be referred to as a first RAB in the following. It should be noted that the described procedure may be valid for media transfer in either direction, i.e. to or from terminal A.

The QoS is now simultaneously monitored in the background, as indicated by a stage 4:6, during the ongoing media communication in stage 4:5. In particular, the first RAB may fluctuate and be "unreliable", typically when obtained as a default RAB for the primary PDP context or for a pre-established secondary PDP context. Also, if further media is added to the session, the QoS requirements would surely change.

The QoS is preferably monitored according to a predetermined monitoring algorithm, based on requirements derived from the SDP information saved in stage 4:4, as well as other factors related to the communicated media and the application(s) used. For example, the QoS of a received media stream may be monitored and evaluated by measuring any of: the number of packets in a buffer in the terminal, the bitrate of the media stream, a bit error rate in received packets, the occurrence of retransmissions, errors in the play-out of the media, etc. In short, basically any parameter that may affect the quality as perceived by end-users.

The monitoring algorithm may be configured in several different ways, and may contain various conditions for evaluating the QoS, e.g. depending on the SDP information, although the present invention is not limited in this respect. For example, the QoS may be deemed acceptable as long as a measured buffer size stays above a certain level, and/or if a measured bitrate of the media stream stays above a certain level, and/or if a measured bit error rate or retransmission rate does not exceed a certain level, etc. Further, the monitored QoS may be deemed unacceptable whenever one or more of the above parameters stays above or does not exceed, respectively, said level(s) for a preset duration, or repeatedly, etc. Detected disturbances may further be measured in a media play-out unit or the like, when presenting received media to the end-user. The monitoring algorithm may be configured to deem the QoS unacceptable if such disturbances exceed a certain level, etc.

If the above measurements generally indicate that the monitored QoS somehow falls below an acceptable level, a following stage 4:7 of activating a secondary PDP context is executed, in order to regain acceptable QoS and a reliable media-adapted (second) RAB fulfilling requirements of the communicated media. These requirements can be partly derived from the SDP message given during the session establishment stage 4:4, as mentioned above. As mentioned above, decreased QoS in relation to requirements may be the result of a fluctuating best-effort RAB, deteriorated radio conditions or added media.

Stage 4:7 may be initiated as the terminal A sends a PDP context request to GGSN in the access network. Activating the secondary PDP context is basically similar to the activation of the primary PDP context. If a first RAB of a pre-established or regular secondary PDP context was used for media transfer in stage 4:5, a new secondary PDP context with a second RAB adapted for the ongoing media communication, is activated in stage 4:7, or the pre-established or regular secondary PDP context and its first RAB may be modified, as described above.

Once the secondary PDP context has been activated and a (new or modified) second RAB has been allocated that fulfils the specific requirements of the communicated media, the session basically switches to the second RAB in a stage 4:8. From now on, the media session is continued on the second RAB over the secondary PDP context, in a final illustrated stage 4:9. The session can now be completed since the new RAB of the secondary PDP context, or modified RAB in the case of a modified pre-established or regular secondary PDP context, has been adapted to the media and application used, and will be more or less "safe" with respect to any requirements of delay, bitrate and error rate imposed by the media type.

Figure 5:
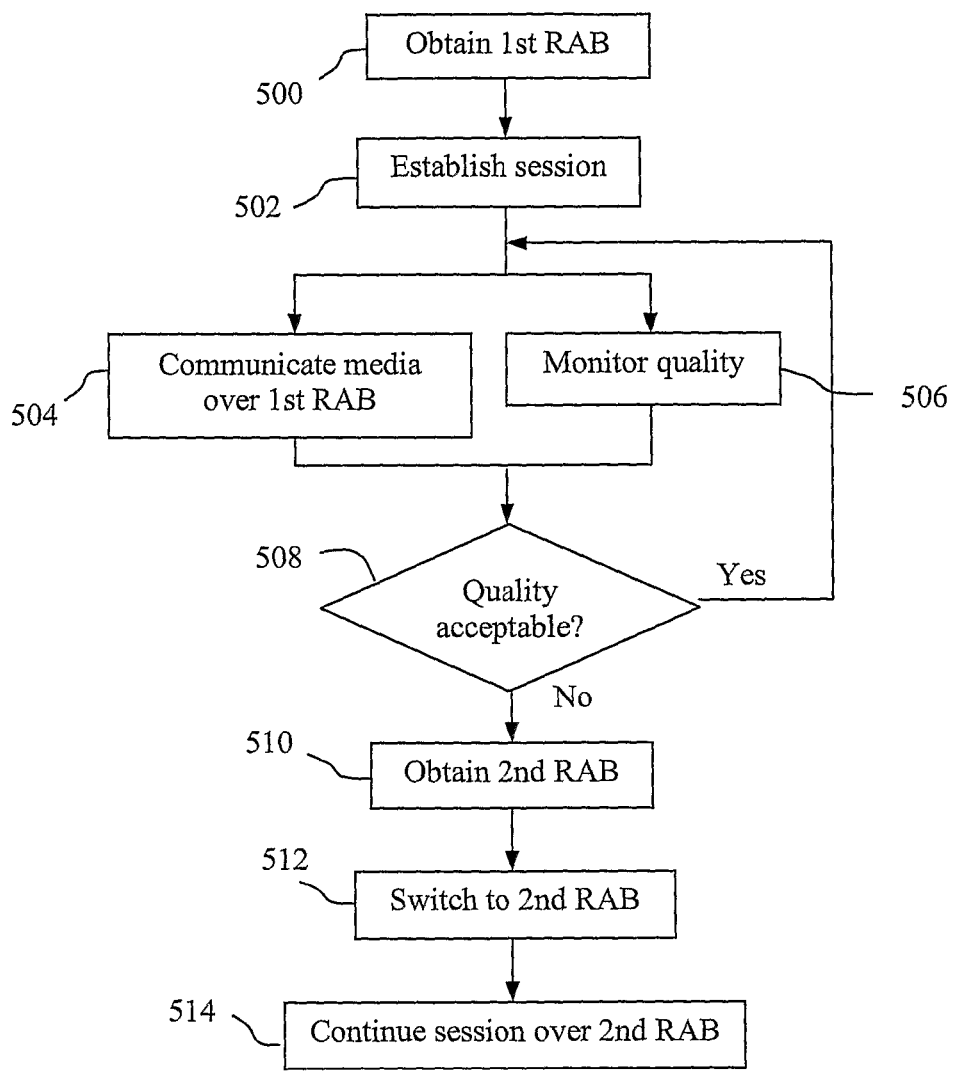
FIG. 5 is a flow chart illustrating a procedure for establishing multimedia communication for a mobile terminal, in accordance with another embodiment.

FIG. 5 is a flow chart illustrating an exemplary procedure for controlling multimedia communication for a mobile terminal currently connected to a mobile access network, in accordance with one aspect of the present invention. The process shown in FIG. 5 may be applied when the quality is monitored either by the terminal or the network, and in the former case it may basically follow the example described above for FIG. 4 when the following steps would be taken by the mobile terminal A.

In a first step 500, e.g. corresponding to stage 4:2, a first RAB is obtained by activating either a primary PDP context basically adapted for communication of signalling messages, or a pre-established or regular secondary PDP context for media, e.g. in addition to a primary PDP context for signalling, as described above. In practice, the terminal may initiate activation of a primary PDP context or a pre-established or regular secondary PDP context by sending a PDP context request to the access network.

In a next step 502, an application is invoked and a session is established with an opposite party, e.g. corresponding to stage 4:4. The session may be established according to the "quick" establishment of omitting activation of a secondary PDP context adapted for the media to be communicated, or after activating a regular secondary PDP context according to conventional procedures. In practice, the terminal may initiate establishment of the session by sending/receiving an INVITE message or similar to/from the opposite party.

In a next step 504, media is communicated (received or transmitted or both) using the first RAB obtained in step 500 for the primary PDP context, or for the pre-established or regular secondary PDP context, e.g. corresponding to stage 4:5. In a parallel step 506, the quality, or QoS, of the media communication is monitored, e.g. corresponding to stage 4:6. As indicated in the figure, step 506 is performed in the background simultaneously with step 504. The quality of received media may be evaluated, e.g., as suggested for stage 4:6 above. The quality of transmitted media may be evaluated at least by measuring a transmitted bitrate, e.g. in relation to the service description in an SDP message, the quality naturally being dependent on the capacity of the obtained first RAB.

In a next step 508, it is determined whether the monitored quality is acceptable, i.e. if a predetermined quality condition is fulfilled according to a suitable predetermined monitoring algorithm, e.g. as described above for stage 4:6. If the monitored quality is deemed acceptable in step 508, the session can continue over the first RAB of the primary PDP context or the pre-established or regular secondary PDP context, thus repeating steps 504 and 506.

However, if the monitored quality is deemed unacceptable in step 508, according to the used monitoring algorithm, it becomes necessary to move on to a step 510 of obtaining a better, e.g. more reliable, RAB by activating a secondary PDP context or by modifying a used first RAB of a pre-established or regular secondary PDP context, corresponding to stage 4:7. Once activated, the communicated media is moved from the first RAB to the second RAB of the newly-activated secondary PDP context, in a next step 512, e.g. basically corresponding to stage 4:8. In this context, the first RAB of a pre-established or regular secondary PDP context may be modified into a media-adapted second RAB.

The session can then continue over the second RAB of the newly-activated secondary PDP context, in a final illustrated step 514 corresponding to stage 4:9. It should be noted that the terminal may well complete the session using the first RAB throughout if the monitored quality remains acceptable, thereby omitting steps 510-514.

Figure 6:
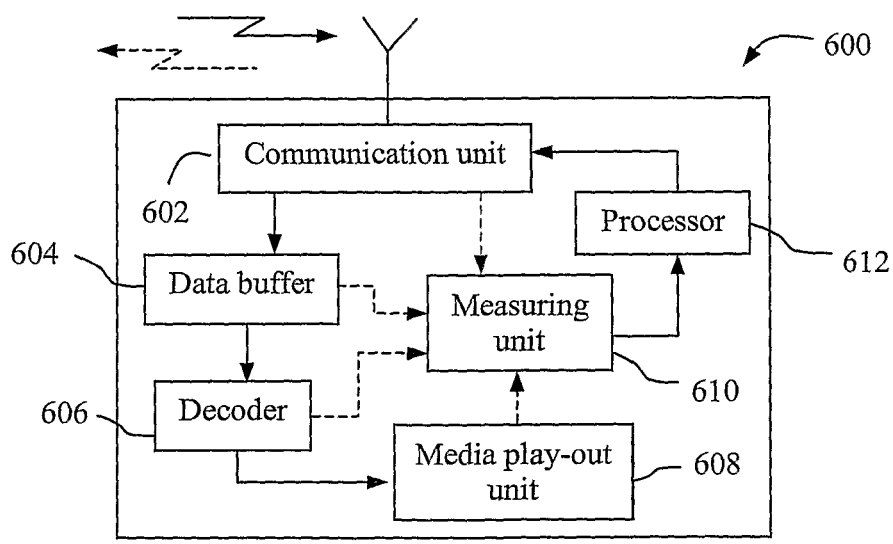
FIG. 6 is a schematic block diagram illustrating an arrangement in a mobile terminal, in accordance with yet another embodiment.

An exemplary embodiment of a mobile terminal arrangement, in accordance with another aspect of the present invention, will now be described with reference to a schematic block diagram shown in FIG. 6. A mobile terminal 600 comprises a communication unit 602 having conventional elements (not specifically shown here for the sake of simplicity) needed for transmitting and receiving radio signals over an antenna. Communication unit 602 is connected to a data buffer 604 adapted to accommodate a queue of data packets of a media stream waiting to be decoded by a decoder 606, or to be transmitted by the communication unit 602, depending on the stream direction. In the shown example, the arrows in the figure are generally directed for reception of a media stream.

The mobile terminal 600 further includes a "media play-out unit" 608 adapted to present, or "play out", decoded media coming from the decoder 606. In the figure, the media play-out unit 608 may represent any equipment for presenting received media to an end-user. The components 602-608 described so far have conventional capabilities, basically, and should be included in any mobile terminal capable of multimedia.

In order to implement the inventive procedure as described above, the communication unit 602 is further adapted to commence media communication in a session with another party using a first RAB. The first RAB may have been obtained for a primary PDP context or for a pre-established secondary PDP context, without requesting a new or modified secondary PDP context specifically adapted for the media to be communicated, hence a default RAB. Alternatively, the first RAB may have been obtained for a regular secondary PDP context based on quality requirements of the session, hence a media-adapted RAB.

The mobile terminal 600 further includes a measuring unit 610 adapted to measure one or more selected quality-related parameters during said media communication using the first RAB. Quality parameters that the measuring unit 610 may measure, as indicated by dashed arrows thereto, include a buffer size in data buffer 604, a bitrate in communication unit

602, an error rate or retransmission rate that may be measured either in communication unit 602 or decoder 606, disturbances in the media play-out or presentation detected from the media play-out unit 608, etc. A processor 612 is further arranged in the terminal 600, adapted to receive measurement results from function 610, monitor and evaluate the quality or QoS of communicated media based on said measurements, and to determine whether the quality is acceptable or not, e.g. as described above for stage 4:6 in FIG. 4. The processor 612 preferably contains a predetermined monitoring algorithm programmed therein, to enable said evaluation. The processor 612 is further adapted to trigger the communication unit 602 to issue a request towards GGSN in a serving access network, for a new or modified secondary PDP context adapted for the currently communicated media, as soon as the quality of media communication becomes unacceptable according to the predetermined monitoring algorithm.

Alternatively or additionally, the quality of the communicated media may also be monitored in the network, either by a node located inside the IMS domain as exemplified below or by a node located outside the IMS domain. In some IMS services, such as Push-to-talk over Cellular (PoC), the media is routed over an IMS node called the "Media Resource Function MRF". In PoC, the combination of the MRF and the SIP application server basically make up the PoC Server. The PoC server has knowledge of the media which it should receive and distribute, as well as it may monitor the quality of the media it receives and distributes. This knowledge obtained by the MRF and the application server can be used to trigger a network initiated PDP context activation procedure or a network initiated PDP context modification procedure.

Figure 7:
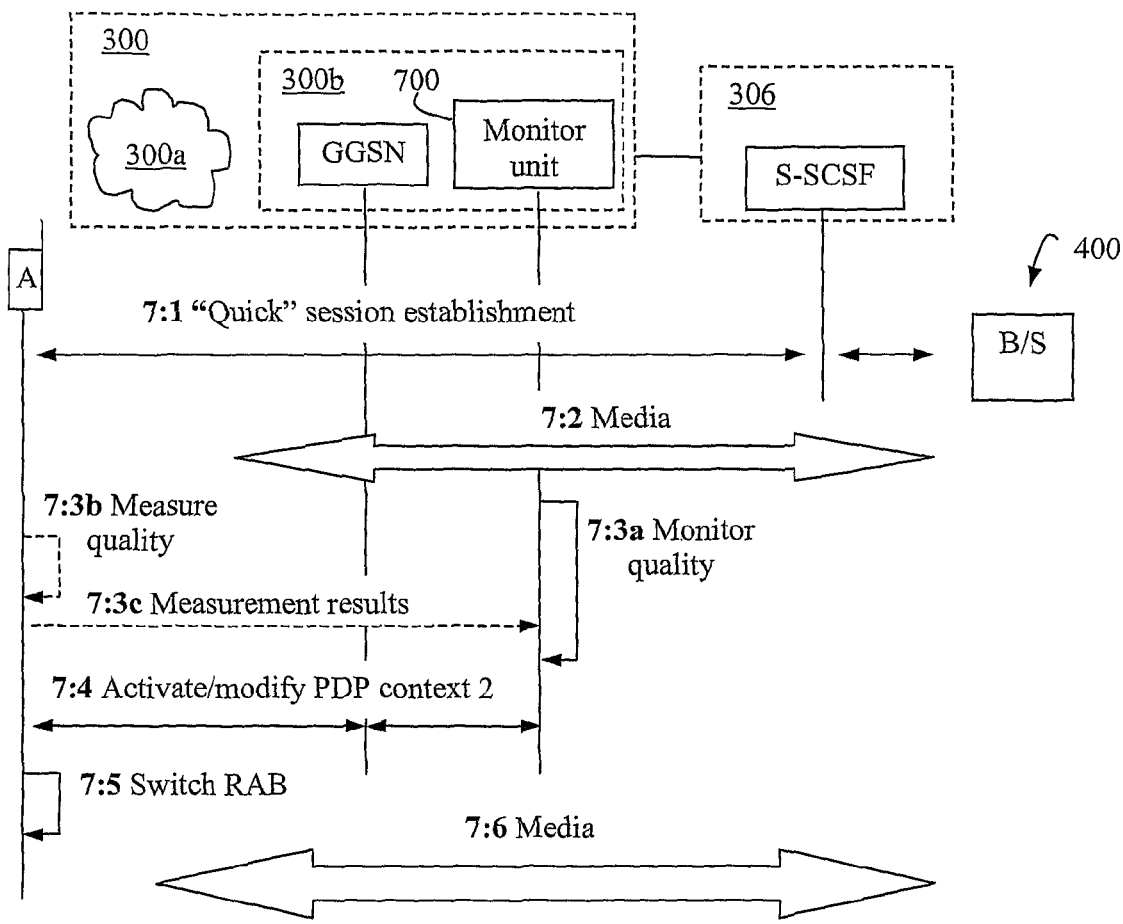
FIG. 7 is a signalling diagram illustrating different stages in the process of establishing multimedia communication for a mobile terminal, in accordance with yet another embodiment.

FIG. 7 is a signalling diagram illustrating different stages in the process of initiating and controlling multimedia communication, according to another embodiment. The scenario is similar to the one shown in FIG. 4, although stages corresponding to 4:1-4:3 are not shown here, with the difference that the quality is monitored by the network instead of, or in addition to, the terminal, and that activation of the secondary PDP context is initiated by the network. Therefore, a monitor unit 700 is shown here as belonging to the access network 300, although it may also reside in the IMS network 306 or in some intermediate node, not shown. The monitor unit 700 may be implemented in a policy node or MRF node or the like. Moreover, the present invention does not exclude that the communication quality can be monitored by both the terminal A and the monitor unit 700.

A multimedia session is to be established with opposite party 400, either by terminal A calling or contacting party 400, or vice versa. As in previous examples, a "quick" session establishment stage 7:1 similar to 4:4 may be used, replacing the previous conventional session establishment stage 3:4 and omitting stage 3:5 of selection and activation of a secondary PDP context at this point. Alternatively, a pre-established or regular secondary PDP context may be activated at this point, as described for previous examples. The description above for stage 4:4 applies also to stage 7:4, and will not be repeated again here.

After establishing the session with the opposite party 400, the communication of media is started over the first RAB, as indicated in a next stage 7:2, assuming that the first RAB may be capable of conveying the media, at least initially, even though it may not have been specifically adapted for the current media. The described procedure may again be valid for media transfer in either direction, i.e. to or from terminal A.

The QoS is now monitored in the background by the monitor unit 700, as indicated by a stage 7:3a, and optionally also by the mobile terminal A as indicated in stage 7:3b during the ongoing media communication of stage 7:2. Optionally, quality measurement results or the like may also be sent from terminal A as feedback to the monitor unit 700 as shown in 7:3c, e.g. using an RTCP protocol, but this is an implementation option.

The QoS is preferably monitored according to a predetermined monitoring algorithm, based on requirements derived from the SDP message saved in stage 7:1, as well as other factors related to the communicated media and the application(s) used. For example, the QoS of a received media stream may be monitored and evaluated by measuring any of: the number of packets in a buffer e.g. in the MRF, the bitrate of the media stream, a bit error rate in received packets.

The monitoring algorithm may be configured in several different ways, and may contain various conditions for evaluating the QoS, e.g. depending on the SDP information, although the present invention is not limited in this respect.

One example may be "PoC version 2" which is a multimedia service that can be used to send media bursts containing voice and/or video data to one recipient or plural members of a group. The monitoring algorithm may detect that the bit rate of the media bursts has increased significantly by the addition of video bits in the media burst.

If the above measurements generally indicate that the monitored QoS somehow falls below an acceptable level, a following stage 7:4 of activating a secondary PDP context is executed, in order to regain acceptable QoS and a reliable second RAB fulfilling requirements of the communicated media. These requirements can be partly derived from the SDP message given during the session establishment stage 7:1, as mentioned above. Stage 7:4 may be initiated as the network A sends a request PDP context activation to the mobile terminal.

Once the secondary PDP context has been activated or modified and a second RAB has been allocated that fulfils the specific requirements of the communicated media, the session switches to the second RAB in a stage 7:5. From now on, the media communication including all media streams occurring in the media session, or a sub-set thereof, is continued on the second RAB over the media-adapted secondary PDP context, in a final illustrated stage 7:6. The session can now be safely completed, since the second RAB of the secondary PDP context has been adapted to the media and application currently used, as in the previous example of stage 4:9 of FIG. 4.

Figure 8:
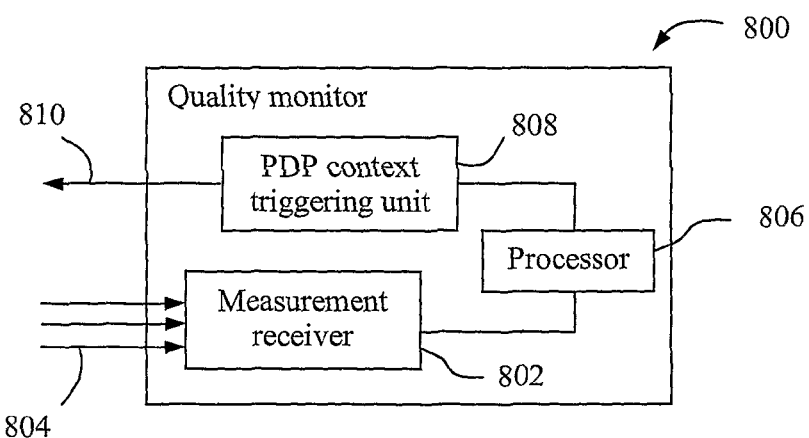
FIG. 8 is a schematic block diagram illustrating an arrangement in a monitor unit that can be implemented in an access network, a multimedia service network, or in some node outside the multimedia service network, in accordance with yet another embodiment.

FIG. 8 is a schematic block diagram illustrating an arrangement in a quality monitor 800 that can be implemented in an access network, a multimedia service network, or in some node outside the multimedia service network, in accordance with yet another embodiment.

The quality monitor 800 has basically the monitoring function described above for block 700 in FIG. 7, and comprises a measurement receiver 802 for receiving quality measurements 804 regarding an ongoing multimedia session for a mobile terminal using a first RAB. The quality measurements 804 may be received from an access network, a multimedia service (e.g. IMS) network, and/or the mobile terminal. Quality monitor 800 further comprises a processor 806 for evaluating the quality measurements 804, and for determining whether a media-adapted second RAB is needed to fulfill QoS requirements of the ongoing multimedia session. If those requirements are not fulfilled, a PDP context triggering unit 808 in the quality monitor 800 sends a message 810 triggering the activation of a new PDP context, or modification of a used pre-established or regular secondary PDP context, as described above. The PDP context triggering message 810 may be sent to the mobile terminal or to a GGSN node in the access network, depending on the implementation.

Using a first RAB, e.g. according to any of the embodiments described above, it may not be necessary to delay the communication of media by waiting for a media-adapted secondary PDP context to be activated and a corresponding second RAB to be allocated. The media communication may thus at least begin over a primary PDP context or pre-established secondary PDP context, and by monitoring and evaluating the quality of communicated media, the quality requirements can be fulfilled by switching to a second media-adapted RAB, if the quality should become unacceptable in relation to the requirements. Thereby, multimedia services may be more attractive to mobile end-users, and the complexity and general amount of signalling can be reduced for multimedia sessions. Further, the overall occupation of bandwidth and/or radio resources may also be reduced.

While the invention has been described with reference to specific exemplary embodiments, the description is in general only intended to illustrate the inventive concept and should not be taken as limiting the scope of the invention. For example, the SIP signalling protocol and IMS concept have been used throughout when describing the above embodiments, although any other standards and service networks for enabling multimedia communication may basically be used. The present invention is defined by the appended claims.

The invention claimed is:

1. A method of establishing a packet-switched multimedia session for a mobile terminal connected to a mobile access network for the communication of media, comprising the following steps:
   obtaining a first default Radio Access Bearer RAB of a pre-established PDP context,
   starting the multimedia session by communicating said media over the first default RAB,
   monitoring and evaluating a quality of communicated media according to a predetermined monitoring algorithm, simultaneously with the media communication over the first default RAB, and
   if the monitored quality is deemed unacceptable according to said monitoring algorithm, obtaining a media-adapted second RAB based on quality requirements of the ongoing media communication, and
   continuing the media communication over the second RAB.

2. The method according to claim 1, wherein the first default RAB is obtained by activating a primary PDP context adapted for signalling messages.

3. The method according to claim 1, wherein the first default RAB is obtained by activating a pre-established secondary PDP context adapted for media communication.

4. The method according to claim 1, wherein the first default RAB is initially adapted for said communicated media.

5. The method according to claim 1, wherein the session is completed over the first default RAB, if the monitored quality remains acceptable throughout the session.

6. The method according to claim 1, wherein the media-adapted second RAB is obtained by activating a secondary PDP context adapted for said communicated media.

7. The method according to claim 3, wherein the media-adapted second RAB is obtained by modifying said first default RAB and pre-established secondary PDP context to be adapted for said communicated media.

8. The method according to claim 6 or 7, wherein the communication of media is switched from the first default RAB to the media-adapted second RAB, once the secondary PDP context has been activated or the pre-established secondary PDP context has been modified.

9. The method according to claim 1, wherein said media-adapted second RAB is obtained when at least one media stream has been added or changed during the ongoing media communication.

10. The method according to claim 1, wherein the quality of a received media stream is monitored by measuring any of the following parameters: a packet buffer size in the terminal, a transfer bit rate, a bit error rate, a retransmission rate, and detected disturbances in the play-out or presentation of media to an end-user, as input to said monitoring algorithm.

11. The method according to claim 10, wherein the monitoring algorithm is configured such that the monitored quality is deemed acceptable as long as the measured buffer size stays above a predetermined level, and/or if the measured bit rate of the media stream stays above a predetermined level, and/or if the measured bit error rate and/or retransmission rate does not exceed a predetermined level.

12. The method according to claim 11, wherein the monitoring algorithm is configured such that the monitored quality is deemed unacceptable whenever one or more of the measured parameters stays above or does not exceed, respectively, said level(s) for a preset duration or repeatedly.

13. The method according to claim 8, wherein SIP is used for signalling and the monitoring algorithm is based on requirements derived from information in an SDP message given in an INVITE message, and/or a response thereto.

14. The method according to claim 1, wherein said quality is monitored and evaluated by the mobile terminal.

15. The method according to claim 1, wherein said quality is monitored and evaluated by a quality monitor in the mobile access network or in a multimedia service network currently controlling the session.

16. The method according to claim 15, wherein said step of obtaining a media-adapted second RAB is initiated by sending a PDP context triggering message to the mobile terminal or to a GGSN node in the mobile access network.

17. An arrangement for establishing a packet-switched multimedia session for a mobile terminal connected to a mobile access network for the communication of media, comprising:
   means for obtaining a first default Radio Access Bearer RAB of a pre-established PDP context,
   means for starting the multimedia session by communicating said media over the first default RAB,
   means for monitoring and evaluating a quality of communicated media according to a predetermined monitoring algorithm, simultaneously with the media communication over the first default RAB, and
   means for obtaining a media-adapted second RAB based on quality requirements of the ongoing media communication, if the monitored quality is deemed unacceptable according to said monitoring algorithm, such that the session can continue over said second RAB.

18. The arrangement according to claim 17, wherein said means for obtaining a first default RAB is configured to obtain the first default RAB by activating a primary PDP context adapted for signalling messages.

19. The arrangement according to claim 17, wherein said means for obtaining a first default RAB is configured to obtain the, first default RAB by activating a pre-established secondary PDP context adapted for media communication.

20. The arrangement according to claim 17, wherein the first default RAB is initially adapted for said communicated media.

21. The arrangement according to claim 17, further comprising means for completing the session over the first default RAB, if the monitored quality remains acceptable throughout the session.

22. The arrangement according to claim 17, wherein said means for obtaining a media-adapted second RAB is configured to obtain the second RAE by activating a secondary PDP context adapted for said communicated media.

23. The arrangement according to claim 19, wherein said means for obtaining a media-adapted second RAB is configured to obtain the second RAE by modifying said first default RAB and pre-established secondary PDP context to be adapted for said communicated media.

24. The arrangement according to claim 23, further comprising means for switching the communicated media from the first default RAB to the second RAB, once the secondary PDP context has been activated or the pre-established secondary PDP context has been modified.

25. The arrangement according to any claim 17, wherein said means for obtaining a media-adapted second RAB is configured to obtain a media-adapted second RAB when at least one media stream has been added or changed during the ongoing media communication.

26. The arrangement according to claim 17, wherein the monitoring and evaluating means is configured to obtain measurements of any of the following parameters: a packet buffer size in the terminal, a transfer bit rate, a bit error rate, a retransmission rate, and detected disturbances in the play-out or presentation of media to an end-user, and to provide said measurements to the processor as input to said monitoring algorithm to indicate the quality of a received media stream.

27. The arrangement according to claim 26, wherein the monitoring algorithm is configured such that the quality is deemed acceptable as long as the measured buffer size stays above a predetermined level, and/or if the measured bit rate of the media stream stays above a predetermined level, and/or if the measured bit error rate and/or retransmission rate does not exceed a predetermined level.

28. The arrangement according to claim 27, wherein the monitoring algorithm is configured such that the monitored quality is deemed unacceptable whenever one or more of the measured parameters stays above or does not exceed, respectively, said level(s) for a preset duration or repeatedly.

29. The arrangement according to claim 24, wherein SIP is used for signalling and the monitoring algorithm is based on requirements derived from information in an SDP message given in an INVITE message, and/or a response thereto.

30. The arrangement according to claim 17, wherein the monitoring and evaluating means is implemented in the mobile terminal.

31. The arrangement according to claim 17, wherein the monitoring and evaluating means is implemented as a quality monitor in the mobile access network or in a multimedia service network currently controlling the session.

32. The arrangement according to claim 31, wherein said means for obtaining a media-adapted second RAB is configured to send a PDP context triggering message to the mobile terminal or to a GGSN node in the mobile access network.

33. An arrangement in a mobile terminal, when connected to a mobile access network, for establishing a packet-switched multimedia session for the communication of media, comprising:
  a communication unit configured to obtain a default first Radio Access Bearer RAB of a pre-established PDP context, and to start the multimedia session by communicating media over the first default RAB, and
  a processor configured to monitor and evaluate a quality of communicated media according to a predetermined monitoring algorithm, simultaneously with the media communication over the first default RAB, and to trigger the communication unit to obtain a media-adapted second RAB based on quality requirements of the ongoing media communication, if the monitored quality is deemed unacceptable according to said monitoring algorithm, such that the session can continue over said second RAB.

34. The arrangement according to claim 33, further comprising a measuring unit configured to provide measurements to the processor from at least one of: a data buffer, a decoder and a media play-out unit.

35. A quality monitor for monitoring and evaluating a quality of communicated media, comprising:
  a measurement receiver for receiving quality measurements regarding an ongoing multimedia session for a mobile terminal using a first default RAB of a pre-established PDP context,
  a processor for evaluating the quality measurements and for determining whether a media-adapted second RAB is needed to fulfill quality requirements of the ongoing multimedia session, and
  a PDP context triggering unit configured to send a message to the mobile terminal or to a GGSN node in the access network, if said quality is deemed unacceptable according to a predetermined monitoring algorithm, said message triggering a media-adapted second RAB based on quality requirements of the ongoing media communication, such that the session can continue over said second RAB.

36. The quality monitor according to claim 35, configured to be implemented in a mobile access network to which the mobile terminal is currently connected, or in a multimedia service network currently controlling the session.

37. The quality monitor according to claim 35, configured to receive said quality measurements from at least one of: a mobile access network to which the mobile terminal is currently connected, a multimedia service network currently controlling the session, and the mobile terminal.

38. The method according to claim 6, wherein said media-adapted second RAB is obtained when at least one media stream has been added or changed during the ongoing media communication.

39. The arrangement according to claim 22, wherein said means for obtaining a media-adapted second RAB is configured to obtain a media-adapted second RAB when at least one media stream has been added or changed during the ongoing media communication.

* * * * *